Dec. 16, 1958    J. H. CASTEL    2,864,173
ELECTRICAL WELL CALIPER TOOL
Filed March 8, 1955    5 Sheets-Sheet 1
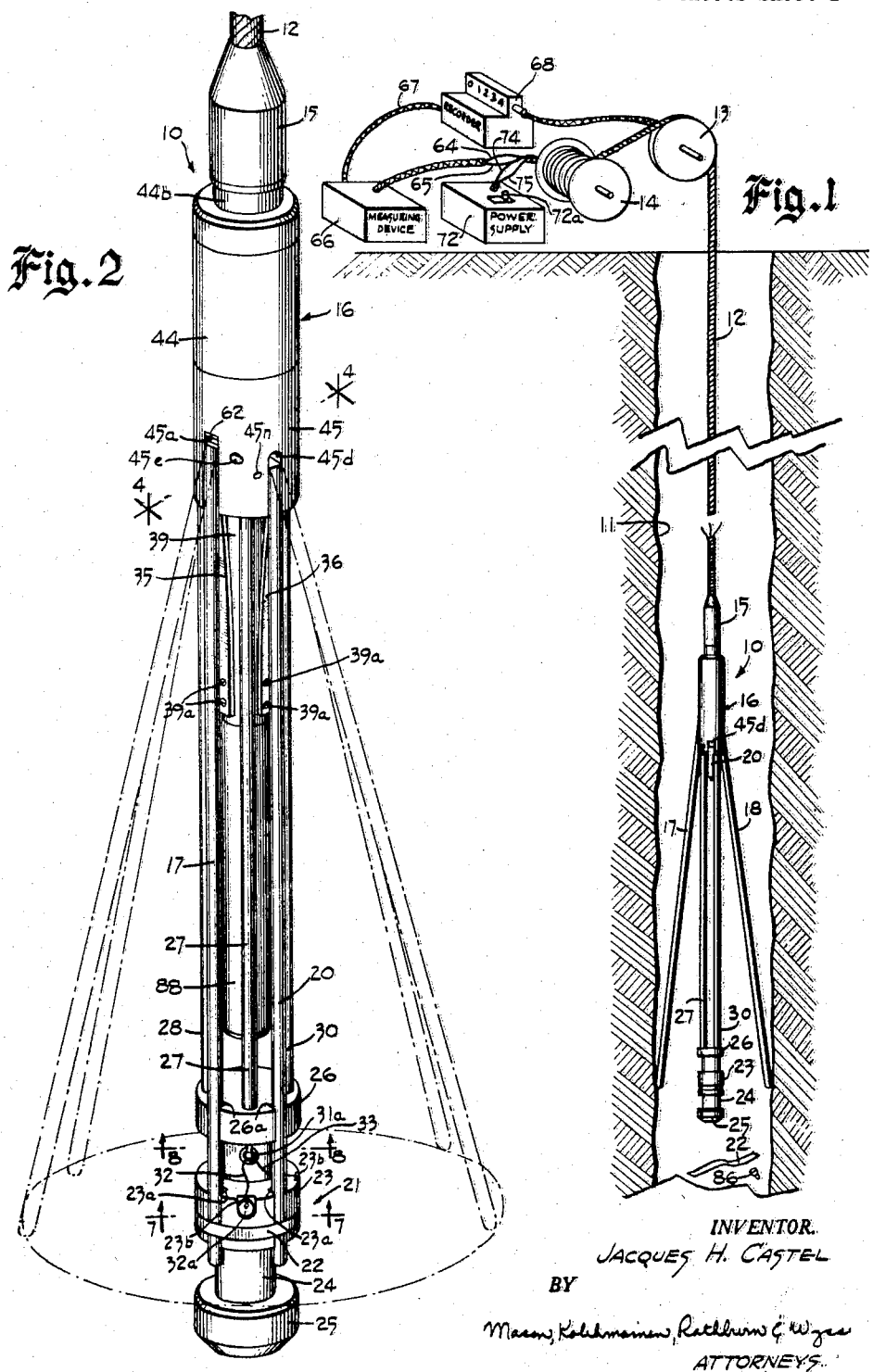
INVENTOR.
JACQUES H. CASTEL
BY
Mason, Kolehmainen, Rathburn & Wyss
ATTORNEYS.

Dec. 16, 1958  J. H. CASTEL  2,864,173
ELECTRICAL WELL CALIPER TOOL
Filed March 8, 1955  5 Sheets-Sheet 2
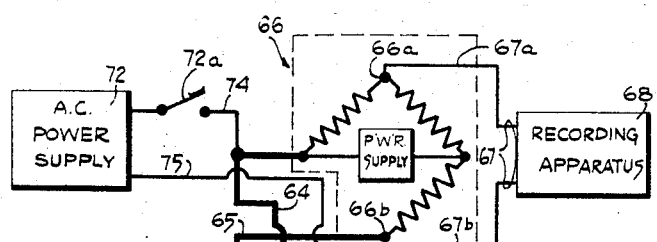
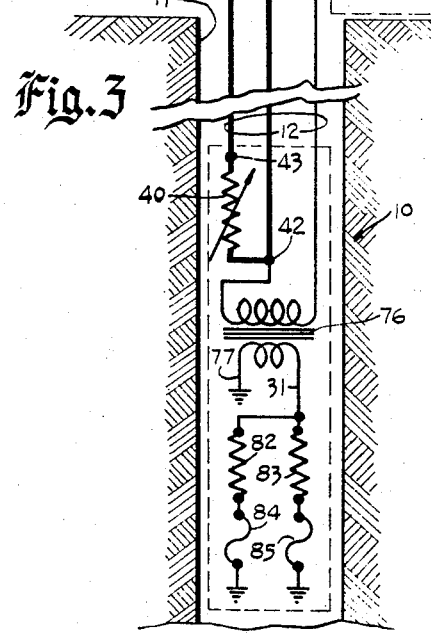
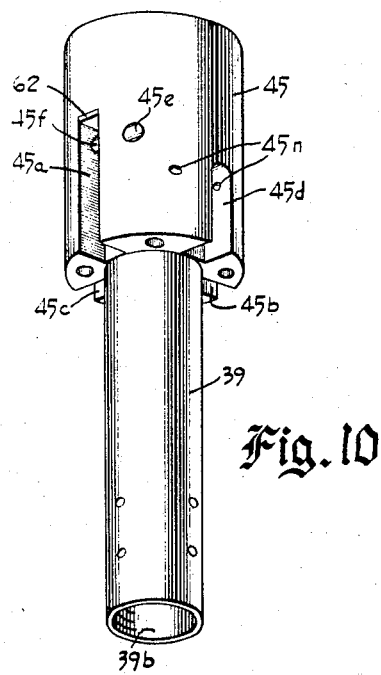
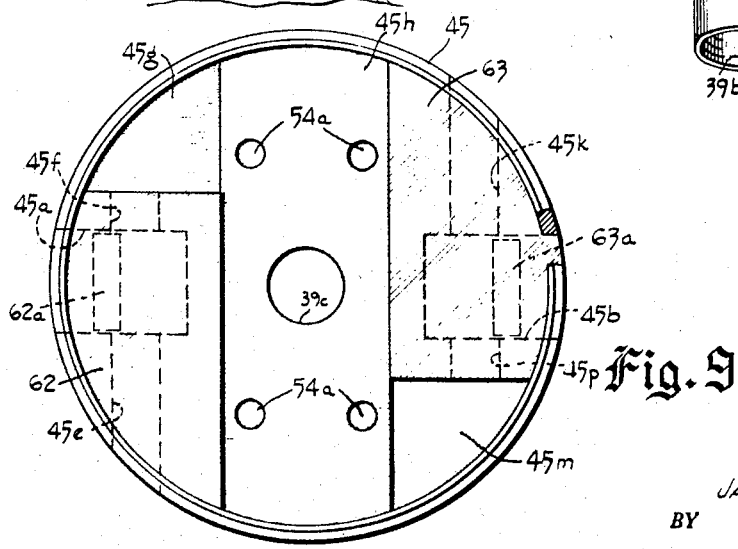
INVENTOR.
JACQUES H. CASTEL
BY
ATTORNEYS

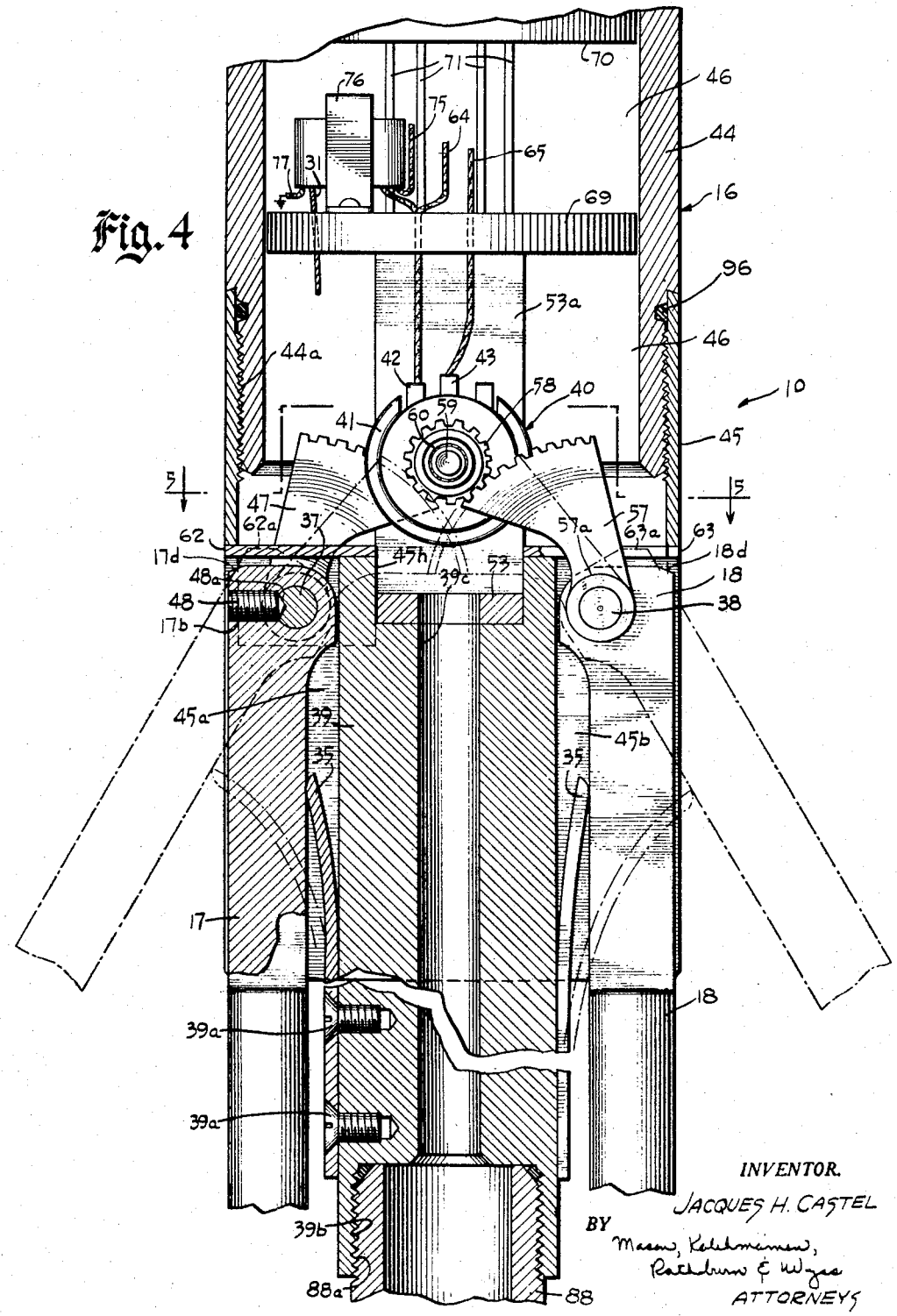

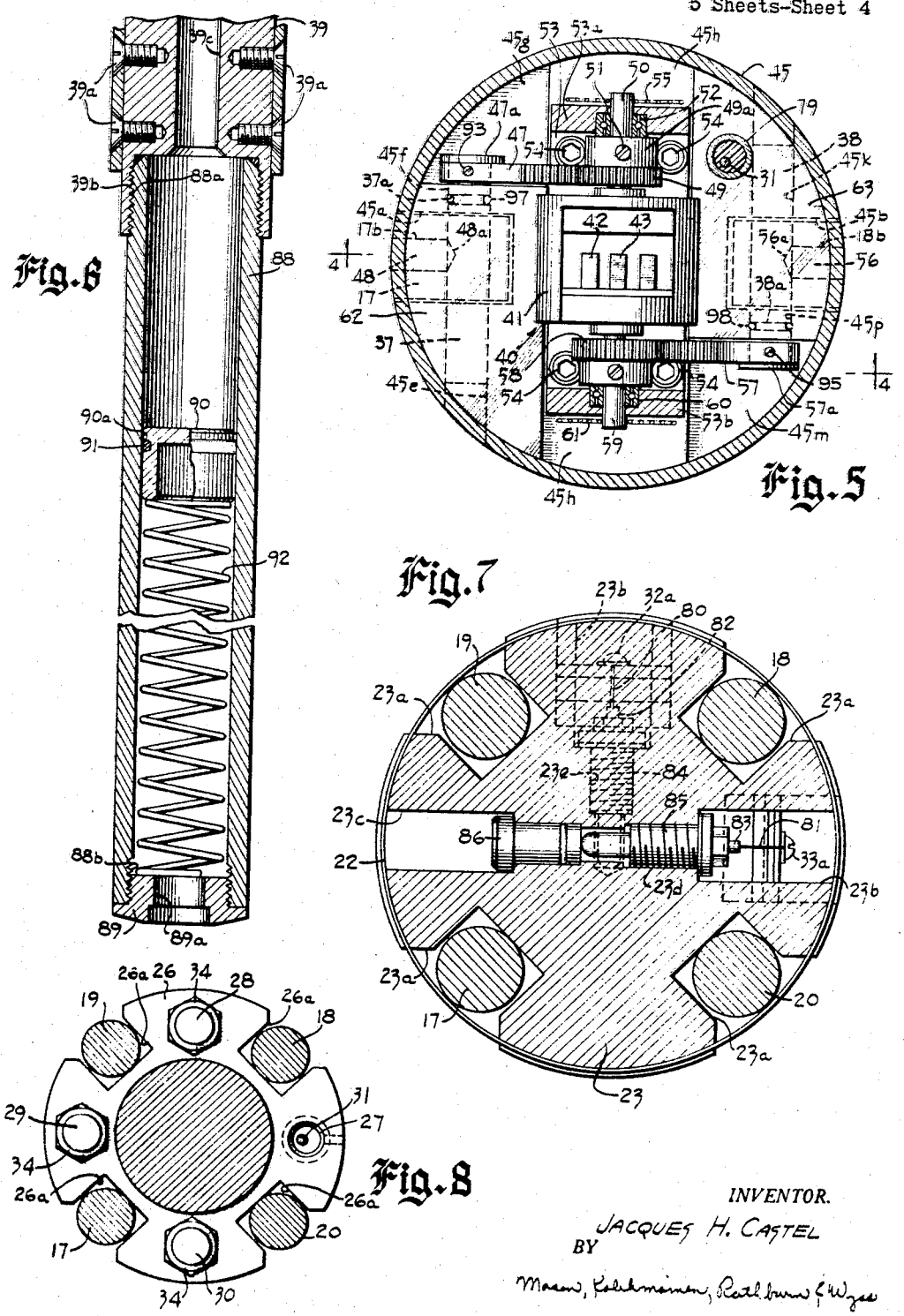

Dec. 16, 1958 J. H. CASTEL 2,864,173
ELECTRICAL WELL CALIPER TOOL
Filed March 8, 1955 5 Sheets-Sheet 5

INVENTOR.
JACQUES H. CASTEL
BY
ATTORNEYS

United States Patent Office 2,864,173
Patented Dec. 16, 1958

2,864,173
ELECTRICAL WELL CALIPER TOOL

Jacques H. Castel, Houston, Tex., assignor to Perforating Guns Atlas Corporation, Houston, Tex., a corporation of Delaware Application March 8, 1955, Serial No. 493,041

12 Claims. (Cl. 33—178)

The present invention relates generally to electrical caliper tools for wells, and more particularly to an electrical system and apparatus for determining and recording variations in the diameter of a well bore.

In the operation of systems for measuring the diameter of a well or borehole, a caliper tool is conventionally lowered into the well and the movement of the arms of the caliper in response to variations in well diameter induce corresponding variations in the electrical resistance of a circuit thus facilitating the measurement of these variations so that they may be recorded at the surface equipment in order to obtain a "caliper log" of the well. However, the devices of the prior art for performing these functions have generally been characterized by an inability to distinguish between minute variations in well diameter due to the fact that the variations in electrical resistance in response to extremely small transverse movements of the caliper arms have been insignificant and, hence, unmeasurable. Moreover, the tools of the prior art have generally involved the use of complex, expensive equipment which are not only subject to frequent operational failures but also introduce considerable inaccuracy in the resistance variation measurements due to the friction inherently encountered in the operation of such complicated devices. Thus, one of the primary objects of the present invention is to provide a new and improved electrical well caliper tool which obviates all of the above described disadvantages of the prior art devices.

Another object of the present invention is to provide a new and improved electrical well caliper tool of simple, low cost construction which is nevertheless featured by sturdiness and ability to operate for a long period of time under varying temperature and pressure conditions normally encountered in a well bore.

A further object of the invention is to provide an improved electrical well caliper tool employing a minimum number of friction producing components thereby to improve the accuracy of the measurements of the diametric variations.

It is also an object of the present invention to provide an improved electrical well caliper tool wherein even small increments of movement of the caliper arms produce appreciable variations in electrical resistance in order to induce significant responses in the measuring apparatus for determining the varying resistance values.

It is likewise an object of the present invention to provide an improved electrical well caliper tool for producing high sensitivity electrical resistance variations in response to movement of the caliper arms.

Still another object of the present invention is to provide a well surveying instrument wherein variations in the impedance of a single rheostat are employed to indicate directly the angular position between a pair of spaced caliper arms, thereby to determine the diameter of the borehole at all depths.

The invention both as to its organization and method of operation together with further objects and advantages thereof will best be understood by reference to the specification taken in conjunction with the accompanying drawings wherein:

Fig. 1 is a cross-sectional view through a portion of a borehole diagrammatically illustrating the operation of the improved well caliper tool of the present invention and showing the caliper arms of the tool extended for following irregularities in the walls of the well during the survey operation;

Fig. 2 is an enlarged perspective view of the well caliper tool shown in Fig. 1 but illustrating the caliper arms in retracted and latched position as employed when the tool is being lowered into a well preparatory to the production of the caliper log;

Fig. 3 is a schematic diagram illustrating the electrical circuit employed in making a caliper log produced as the caliper tool of the present invention traverses the borehole;

Fig. 4 is an enlarged fragmentary vertical section taken along the line 4—4 in Figs. 2 and 5 and particularly illustrating the operation of the caliper arms in producing variations in the resistance of a rheostat or potentiometer embodied in the caliper tool;

Fig. 5 is a cross-sectional view taken substantially along line 5—5 in Fig. 4 assuming, of course, that the entire tool had been shown in the latter;

Fig. 6 is a fragmentary vertical cross-sectional view particularly illustrating the pressure equalizing facilities of the caliper tool of the present invention which facilities are adapted to compensate for diametric changes of the fluid in the tool due to expansion or contraction of the fluid under varying temperatures and pressures encountered in the well bore;

Fig. 7 is an enlarged cross-sectional view taken along a line substantially corresponding to the line 7—7 in Fig. 2 and particularly showing the mechanism for releasing the latching means holding the caliper arms in the retracted position shown in Fig. 2;

Fig. 8 is an enlarged cross-sectional view taken along the line 8—8 in Fig. 2;

Fig. 9 is a cross-sectional view looking in the direction of the arrows 5—5 in Fig. 4, assuming that the entire tool has been shown in the latter, and having certain of the moving parts of the tool removed in order to facilitate the illustration of the interior of the housing for these parts;

Fig. 10 is a perspective view of the bottom closure member for the upper body of the caliper tool of the present invention.

Figure 11:
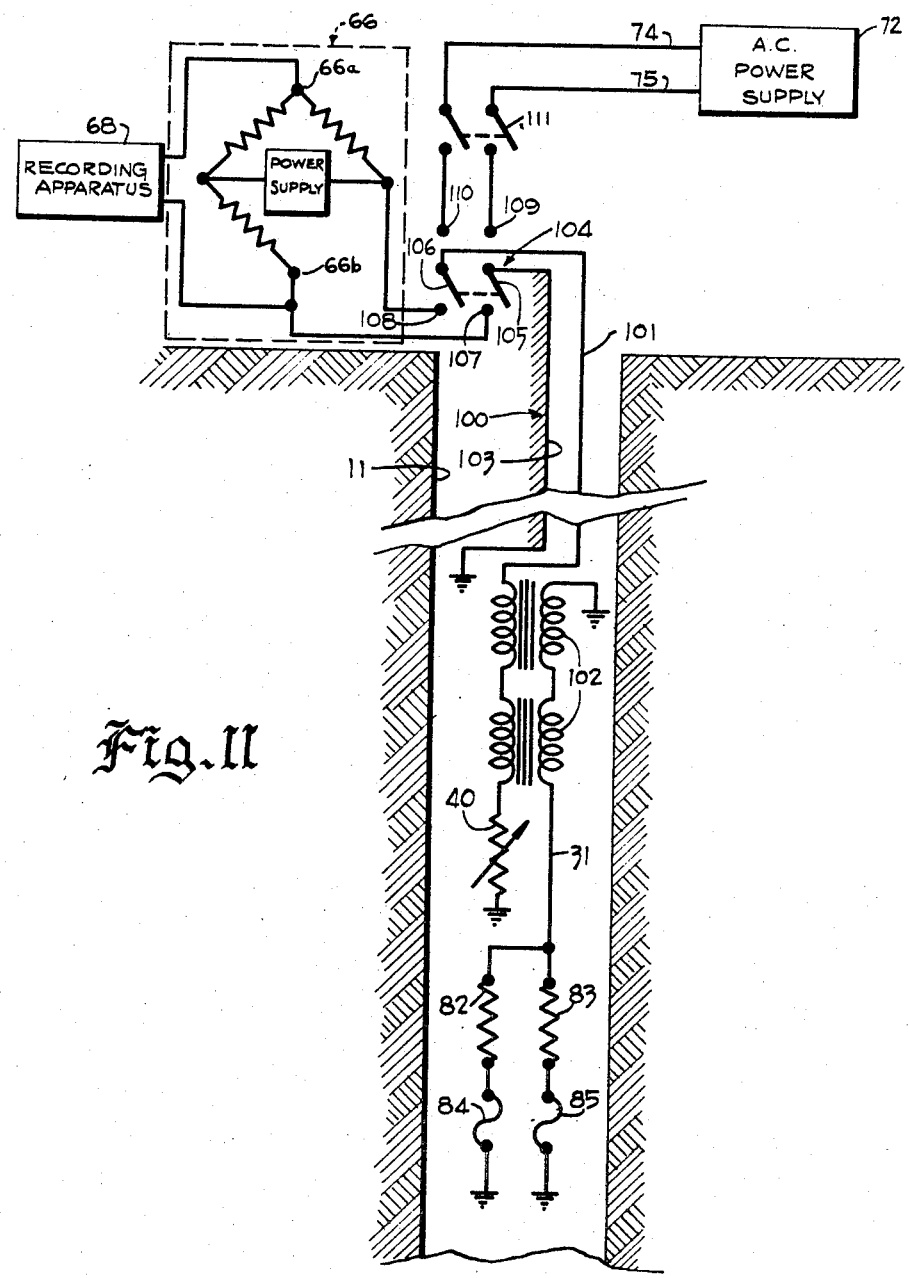
Fig. 11 is a partially schematic, partially diagrammatic illustration of a single conductor system for logging a well with the apparatus of the present invention.

Referring now to the drawings and more particularly to Figs. 1 and 2 thereof, the improved caliper tool of the present invention, indicated generally as 10, is there illustrated as being carried upon the lower end of a cable 12 so as to be raised and lowered within a well or borehole 11.

The borehole 11, as is customary in drilling operations, may contain fluid such as drilling mud although such fluid has not been shown in Fig. 1. The upper end of the cable is trained over a sheave 13 and is wound upon a suitable take-up and supply spool 14. It will be understood that both the sheave 13 and the supply spool 14 are preferably driven by a suitable motor not shown in the drawings in order to raise or lower the caliper tool in accordance with the direction of rotation of the motor. In should also be recognized that the caliper tool 10 is equally adapted for survey operations in a cased well bore for locating casing breaks or counting collars as well as for operations in an uncased well of the type illustrated in Fig. 1.

Although the caliper tool of the present invention may, if desired be operated with a single conductor cable, the cable 12 illustrated in Fig. 1 is shown as comprising a plurality of conductors contained within the usual outer covering or metal sheath. The caliper tool 10 is attached to the lower end of this cable by means of a coupling member 15 secured at one end to the cable sheath and supporting at its other end an elongated upper body member 16 to be described more fully hereinafter. A pair of diametrically opposed caliper arms 17 and 18 are supported for respective pivotal movement upon hinge pins 37 and 38 carried by the upper body member. For the purpose of maintaining the tool 10 in approximately the center of the borehole 11 as it is raised therein, a pair of centralizer arms 19 and 20 are also mounted for pivotal movement upon suitable hinge pins (not shown) carried at positions intermediate the caliper arms 17 and 18.

As best shown in Fig. 2, the two caliper arms and the two centralizer arms are preferably retained in retracted or latched position by a suitable electrically releasable latching means 21 as the caliper tool is lowered to a predetermined depth in the bore hole preparatory to making the caliper log. This latching means preferably comprises an annular band 22 encircling an explosive containing housing 23 the outer periphery of which includes a plurality of spaced longitudinal slots 23a for accommodating the lower ends of the caliper arms 17 and 18 and the centralizer arms 19 and 20. Thus, the band retains the four arms in retracted position out of engagement with the walls of the borehole 11 while the caliper tool is being lowered to any suitable borehole depth at which the caliper log is initiated. The housing 23 is carried upon a lower body member 24 which also supports a tip 25 at the lower extremity of the tool and a guide disc 26 located above the housing. The latter guide disc, like the housing 23, includes a plurality of spaced longitudinally extending slots 26a in its outer periphery for receiving the caliper arms 17 and 18 and the centralizer arms 19 and 20 in order to lend rigidity to the structure. A plurality of spaced tubular members or rods 27, 28, 29 and 30 interconnect the upper and lower body members 16 and 24 in order to form a strong rigid subsurface assembly. The tubular member 27, in addition to its supporting function just mentioned, also serves to house a connector 31 best shown in Fig. 8 for delivering power to a terminal 31a (Fig. 2) on the lower body member 24. This power is supplied through connectors 32 and 33 to terminals 32a and 33a carried in recesses 23b on the exterior wall of the housing 23 in order to actuate the electrically releasable latching means 21 in a manner to be described more fully hereinafter. In order to facilitate the assembly of the lower body member 24 upon the tubular supports 27 to 30, inclusive, the lower ends of the latter are preferably threaded and extend through spaced bores in the support disc 26 in order to receive nuts 34 as best shown in Fig. 8.

For the purpose of urging the caliper arms 17 and 18 and the centralizing arms 19 and 20 radially of the caliper tool 10 when the latching means 21 is released, a plurality of spaced leaf springs are each secured at one end as by machine screws 39a to a cylindrical housing 39 carried by and extending downwardly from the upper body member 16 and each has its free end in engagement with its associated arm. The diametrically opposed leaf springs in engagement with the caliper arms are designated as 35 while those associated with the centralizer arms are designated as 36. Thus, when the latching means 21 is released the four arms of the caliper tool are moved in unison from their solid line positions shown in Figs. 2 and 4 to the positions represented by the broken lines whereupon the lower ends of all of the arms engage the walls of the borehole 11 as best shown in Fig. 1.

The leaf springs associated with the centralizer arms 19 and 20 preferably possess a somewhat stronger thrust than those associated with the caliper arms 17 and 18 and, hence, support the caliper tool in approximately the center of the borehole 11 even in those cases where the borehole is slanted or drilled at an angle with respect to the earth's surface. In this manner, the springs associated with the caliper arms 17 and 18 are not required to support the tool, and their strength is limited solely to that required to insure that the arms follow the contours of the borehole. The use of springs with relatively light thrusts in conjunction with the caliper arms provides higher sensitivity measurements of the borehole diameter as the tool is moved during the survey.

As previously indicated, after the latching means 21 is released the caliper tool is hoisted by driving the sheave 13 and the takeup spool 14 of the surface equipment in order to induce the lower portions of the arms to follow irregularities in the borehole wall caused by such factors as cavities, projections and the like. The caliper arms 17 and 18 and the centralizer arms 19 and 20 are all pivoted upon the body member 16 in response to engagement with these irregularities. As previously indicated, the centralizer arms 19 and 20 function merely to orient the caliper tool end at approximately the center of the borehole 11. Movement of the caliper arms 17 and 18, however, induces a corresponding variation in the electrical resistance of a potentiometer or rheostat 40 carried by the upper member 16.

More specifically and in accordance with an important feature of the present invention, the caliper arm 17 is employed to rotate the case or support 41 for the slide wire of the potentiometer while movement of the caliper arm 18 functions to rotate the variable tap or movable arm of the potentiometer. The purpose of this mechanism is to employ a single rheostat to indicate, by the resistance measured across its output terminals 42 and 43, the angular position of the caliper arms 17 and 18, thereby to facilitate calibration of the measured resistance values in terms of the different diameters encountered as the caliper tool 10 traverses the borehole. To this end, the upper body member 16 preferably comprises a somewhat cup shaped housing 44 in the form of a hollow cylinder closed at one end and having an externally threaded end portion of reduced diameter as indicated at 44a for the purpose of receiving an internally threaded closure member 45. The upper end of the cup shaped housing is closed by a cap 44b (Fig. 2) which is provided with an externally threaded portion of reduced diameter for engaging an internally threaded opening (not shown) in the coupling 15 in order to secure the upper body member 16 to the cable 12.

In order to enclose the rheostat 40 and certain other components to be described hereinafter, the cup shaped housing 44 cooperates with the closure member 45 to form a chamber 46 preferably filled with a suitable insulating fluid such as oil. The junction between the portion 44a of the cup shaped housing 44 and the closure member 45 is sealed by an annular sealing ring 96 which functions to prevent passage of fluid between the chamber 46 and the borehole 11, thereby preventing the entrance of borehole fluid into the chamber and also preventing egress of oil from the chamber into the borehole. The closure member 45 is provided with a plurality of spaced longitudinally extending slots 45a, 45b, 45c and 45d for respectively accommodating the caliper arms 17 and 18 and the centralizer arms 19 and 20. As shown in Figs. 2 and 10 of the drawings, the centralizer arms are mounted for pivotal movement with respect to the upper body member 16 upon hinge pins extending between horizontally aligned transverse bores 45n (Fig. 10) formed in opposed walls defining the slots 45c and 45d. As previously indicated, the caliper arms 17 and 18 are respectively mounted upon the hinge pins 37 and 38 extending between opposed walls defining the slots 45a and 45b. The slots 45c and 45d are preferably somewhat shorter than the slots 45a and 45b with the result that the centralizer arms are carried upon the closure member 45 at horizontally aligned positions slightly below the horizontally aligned hinge pins 37 and 38. As best shown in Fig. 5, one end of the hinge pin 37 fits within a small bore 45e extending from the longitudinal slot 45a to the exterior face of the closure member 45 while the other end of this pin extends horizontally through a bore 45f in the closure member and protrudes into the chamber 46 in order to receive a sector gear 47 on its exposed end portion. An O-shaped packing ring 97 encircling the hinge pin 37 and carried within an annular groove 37a in the periphery of the pin functions to prevent the passage of fluid in either direction through the bore 45f. The caliper arm 17 is preferably secured in fixed position upon the hinge pin 37 by a set screw 48 passing through an internally threaded opening 17b in the arm member and having a conically shaped tip 48a adapted to be accommodated within a correspondingly shaped indentation in the hinge pin. As shown in Figs. 4 and 5, the sector gear 47 includes a raised circular boss 47a having a recess therein to enable the sector gear to fit over the end of the pin 37 protruding into the chamber 46 whereupon the sector gear may be attached to the end of the pin 37 in any suitable manner as, for example, by set screw 93.

In order to provide space for the reception of the sector gear 47 within the chamber 46 upon the end of the hinge pin 37, the closure member 45 is preferably recessed as indicated at 45g. The sector gear meshes with a spur gear 49 which includes a circular boss 49a to facilitate attachment of the spur gear by means of set screw 51 to a shaft 50 extending parallel to the hinge pin 37 within the chamber 46. This shaft is rotatably journaled at one end within a bearing assembly 52 supported upon an upright leg 53a of a substantially U-shaped bracket 53. The latter bracket has its base portion secured within a channel 45h extending horizontally of the closure member 45 by means of a plurality of spaced machine screws 54 which are adapted to be accommodated within tapped openings 54a (Fig. 9) in the closure member.

For the purpose of imparting the movement of the caliper arm 17 to the casing 41 of the rheostat 40, this casing is mounted in any suitable manner upon the non-journalled end of the shaft 50. A spiral coil spring 55 encircling the journalled end of the shaft 50 and attached to the upright leg 53a takes up any backlash between gears 47 and 49 or between the casing 41 and the control arm of the rheostat, thereby to provide for exact movement of the casing 41 in response to movement of the caliper arm 17. It will thus be observed that movement of the latter caliper arm upon engagement with irregular surfaces of the borehole 11 causes the hinge pin 37 to rotate the sector gear 47 which in turn drives the spur gear 49 and rotates the shaft 50 carrying the potentiometer casing. The direction of rotation of the casing 41 is obviously a function of the direction of movement of the caliper arm 17 which is, in turn, dependent upon whether the arm engages a recessed or raised surface of the borehole walls. The amount of rotation of the casing 41 in response to a given increment of movement of the caliper arm 17 is a function of the gear ratio between the sector 47 and the spur gear 49 and, accordingly, may be adjusted to any desired value by proper selection of these gears as explained more fully in the ensuing description.

In similar manner, the caliper arm 18 is attached to the hinge pin 38 in fixed position by means of a set screw 56 which, like the set screw 48 previously described, possesses a pointed end portion 56a adapted to be received within an indentation of similar configuration in the hinge pin. The hinge pin 38, as best shown in Fig. 5, has one end portion carried within a horizontal bore 45k extending from a wall of the slot 45b to the outer surface of the closure member 45. The other end of the hinge pin 38, on the other hand, fits within a bore 45p extending horizontally of the closure member from the opposed wall of the slot 45b and opening into the chamber 46. In order to prevent passage of fluid in either direction through the bore 45p along the external surface of the pin 38, there is provided a sealing ring 98 encircling the pin and carried within a peripheral groove 38a therein. The end of the hinge pin 38 extending into the chamber 46 receives the bossed end 57a of a sector gear 57 secured thereto by means of a set screw 95. To impart the movement of the hinge pin 38 to the variable tap of the rheostat 40, the sector gear 57, as best shown in Figs. 4 and 5, meshes with a small spur gear 58 mounted upon a shaft carrying the variable tap. The variable tap is electrically connected to the terminal 43 of the rheostat in conventional manner and, when moved over the slide wire of the rheostat, produces a variable resistance between the terminal 43 and the terminal 42 connected to one end of the slide wire. The shaft 59 has one end rotatably journalled within a bearing assembly 60 carried upon an upright leg 53b of the U-shaped bracket 53 which leg extends vertically through the chamber 46 parallel to the leg 53a previously described. To provide a space within the chamber 46 for the reception of the sector gear 57 upon the end of the hinge pin 38, the closure member 45 is suitably recessed as indicated at 45m in Figs. 5 and 9. A spiral coil spring 61, similar in construction to the coil spring 55, is carried by the leg 53b and encircles the end of the shaft 59 protruding beyond this leg in order to absorb backlash between the spur gear 58 and the sector gear 57 and to compensate for backlash between the variable tap and the rotatable casing 41 of the potentiometer 40, thereby to effect exact correlation between rotation of the variable tap of the rheostat and movement of the caliper arm 18.

From the foregoing explanation, it will be recognized that engagement of the caliper arm 18 with irregularities along the surface of the borehole 11 induces the hinge pin 38 to rotate the sector gear 57 in order to drive the spur gear 58 and the shaft 59 carrying the movable arm or variable tap of the potentiometer. The direction of rotation of the variable tap is, of course, a function of the direction of movement of the caliper arm 18 while the amount of such rotation in response to a given movement of the caliper arm 18 is again a function of the gear ratio between the sector gear 57 and the spur gear 58.

In order to limit the radial movement of the caliper arms 17 and 18 outwardly from the tool 10, small cover plates 62 and 63 are respectively provided covering the upper ends of the slots 45a and 45b. These cover plates are secured in any suitable manner, as by bonding or welding, to the closure member 45 and are sealed to the closure member along all of their peripheral edges in order to prevent fluid communication between the oil within the chamber 46 and the fluid within the borehole 11. The cover plates 62 and 63 may be provided with suitable indentations 62a and 63a for respectively receiving surface limiting portions 17d and 18d of the caliper arms 17 and 18. In one particular embodiment of the present invention which has been successfully employed to produce a caliper log, the plates 62 and 63 are arranged to limit the radial movement of the caliper arms 17 and 18 to include an angle of 60° between the two arms or to an angle of 30° between the longitudinal axis of the tool and the axis of each of the individual caliper arms. The gear ratio between each of the sector gears 47 and 57 and the spur gears 49 and 58 respectively associated therewith are then selected to provide for maximum movement of the variable tap of the potentiometer with respect to the slide wire between the limits of movement of the caliper arms 17 and 18. However, it has been found desirable to limit the movement of the variable tap to traverse only a linear portion of the slide wire, and, accordingly, a gear ratio of four to one between each of the sector gears and its associated spur gear has been found to produce optimum results. With this gear ratio the maximum 30° movement of the caliper arms 17 and 18 induces 120° of rotation of the shaft carrying the variable tap of the rheostat 40, and at the same time induces 120° of rotation in the reverse direction of the shaft 50 carrying the casing 41 of the rheostat. Thus, a total relative rotation of 240° between the variable tap and the slide wire of the rheostat is induced by movement of the caliper arms 17 and 18 from their retracted positions to their maximum outer positions indicated by the broken lines in Fig. 4. By limiting the relative movement between the variable tap and the slide wire or casing of the potentiometer 40 to a maximum of 240°, the use of the nonlinear portions customarily encountered at each end of the winding of the rheostat is avoided.

It will be apparent from the foregoing discussion that the mechanisms interconnecting each of the caliper arms 17 and 18 and the movable elements of the potentiometer are so arranged that the cumulative motion of the arms results in cumulative changes in the resistance values appearing across terminals 42 and 43 of the rheostat. Specifically, movement of the caliper arms 17 and 18 away from each other at portions of the borehole having relatively large diameters induces a relatively large differential rotation between the casing 41 and the variable tap of the potentiometer 40, thereby to produce a relatively large change in the resistance value appearing between terminals 42 and 43. Conversely, when the caliper arms 17 and 18 are moved toward each other at portions of the borehole possessing small diameters, the relative movement between the casing 41 and the variable tap of the potentiometer 40 is small and the resistance value appearing between terminals 42 and 43 is correspondingly decreased.

In order to facilitate measurement of the variations in the resistance of the potentiometer 40 at the surface, the terminals 42 and 43 are respectively connected to conductors 64 and 65 extending upwardly through the chamber 46, through the cable 12 and to a measuring circuit indicated generally by the reference numeral 66 in Fig. 1. The resistance variations measured by the measuring circuit 66 are applied through signal connector 67 to a recording apparatus 68 which is adapted to provide a continuous indication of these resistance variations upon a suitable recording medium which is driven in synchronism with the hoisting of the caliper tool 10 within the borehole. The indications appearing on the record produced by the apparatus 63 are calibrated to provide a direct measurement of the borehole diameter at each depth traversed by the caliper tool 10 as it is raised within the borehole 11, thereby to produce a curve customarily referred to as a caliper log.

In order to prevent twisting of the conductors 64 and 65 within the chamber 46, these conductors are guided through appropriate openings in a pair of spaced terminal plates 69 and 70 carried within the chamber as best shown in Fig. 4. The terminal plate 69 is affixed in any suitable manner to the legs 53a and 53b of the bracket 53, and, accordingly, is maintained in fixed, non-rotatable position within the chamber 46. A plurality of fixed spacer rods 71 interconnect the terminal plate 69 and the terminal plate 70 in order to provide a rigid, non-rotatable support for the latter plate.

Turning now to a description of the apparatus for releasing the electrically releasable latching means 21 after the caliper tool 10 has been lowered to the proper borehole depth, it will be observed by reference to Figs. 1 and 3 that this equipment includes a suitable source of power 72, including an on-off switch 72a connected through conductors 74 and 75 and through the cable 12 to the primary winding of a transformer 76 mounted upon the terminal plate 69 within the chamber 46 of the caliper tool 10. The secondary winding of this transformer has one side grounded to the caliper tool 10, as indicated at 77, while the other side of this secondary winding is connected through signal connector 31 to the housing 23 on the lower body member 24. The connector 31, as previously described, passes through the chamber 46 and emerges from this chamber and through a terminal 79 located at the junction between the closure member 45 and the tube 27 interconnecting the upper and lower body members 16 and 24. The terminal 79 preferably includes a suitable grommet or other fluid sealing means surrounding the conductor 31 in order to prevent the passage of fluid in either direction between the chamber 46 and the borehole 11. The conductor 31 terminates at its lower end at the terminal 31a carried upon the outer surface of the body member 24 and is there connected through connectors 32 and 33 to terminals 32a and 33a carried within the spaced slots 23b in the periphery of the housing 23. As best shown in Fig. 7, the terminals 32a and 33a are respectively connected through conductors 80 and 81 and through load resistors 82 and 83 to igniters 84 and 85 which contain a charge of explosive powder and a fuse wire for detonating the same. The igniters 84 and 85 include externally threaded body members which are secured within internally threaded radial bores 23d and 23e in the housing 23 displaced 90° one from the other. Upon current flow to either or both of the igniters 84 and 85, the charge therein is exploded with the result that a releasing pin is directed through a radial bore 23c formed in the housing 23 and through the arm-retaining band 22 surrounding this housing. Passage of the releasing pin 86 through the band, of course, severs the latter and permits the leaf springs 35 and 36 to direct the two caliper arms 17 and 18 and the two centralizer arms 19 and 20 outwardly from the longitudinal axis of the caliper tool 10. The arm-retaining band 22 and the releasing pin 86, as illustrated in Fig. 1, are usually left within the borehole as debris.

From the above explanation it will be observed that the current for detonating the two igniters 84 and 85 is derived from the same source and, accordingly, the energizing circuits for these igniters are effectively connected in parallel. The use of load resistors in these energizing circuits insures detonation of one of the igniters even though it may be inadvertently paired with a shorted or otherwise defective igniter. Thus, detonation of at least one and probably both of the igniters 84 and 85 is insured, thereby minimizing the possibility of a "misrun" due to the failure of the igniters to function properly.

Turning now to Figs. 4 and 6 for a consideration of the facilities employed to balance the internal pressure of the fluid within the chamber 46 of the tool with the well pressure surrounding the tool, it will be observed that these facilities comprise the cylindrical member 39 forming a part of and extending downwardly from the closure member 45 and having an internally threaded end portion 39b for accommodating an externally threaded portion 88a of a cylindrical member 88. The lower end of the cylinder 88 is internally threaded as indicated at 88b in order to receive a cap member 89 having a centrally disposed passageway 89a in fluid communication with the borehole fluid. As shown in Fig. 6, a piston 90 carried within the cylinder 88 is exposed on its upper face to the oil or insulating fluid within the chamber 46 through a passageway 39c in the cylindrical member 39 and is exposed on its lower face to the fluid within the borehole 11 through the passageway 89a. The piston 90 includes an annular groove 90a in its outer periphery for accommodating a piston ring 91 of conventional construction for preventing the passage of fluid in either direction along the outer walls of the piston. A compression spring 92 interposed between the upper edge of the cap 89 and the lower face of the piston 90 maintains the latter in a proper position within the cylinder 88 which varies with volumetric changes of the fluid within the chamber 46 due to thermal expansion or contraction of the fluid. Thus, the piston 90 functions as a pressure equalizing means to compensate for these volumetric changes. Moreover, this piston also compensates for the compressibility of the chamber fluid under varying pressures and thus insures a complete balance between the internal pressure of the chamber fluid and the pressure existing in the fluid within the borehole 11.

Turning now to Fig. 3 for a description of the electrical circuit involved in the operation of the caliper well logging system described above, it will be observed that this system includes the alternating current power supply 72 including the arm releasing switch 72a connected through conductors 74 and 75 to the caliper tool 10. It will be observed, however, that the conductor 74 merges with and is common to the conductor 64 leading to the measuring device 66 thus facilitating the use of a three conductor cable extending from the subsurface equipment to the surface. The conductors 64 and 65, as previously indicated, connect the measuring device 66 to the output terminals 42 and 43 of the rheostat 40 in the caliper tool. The conductors 64 and 75 connected to the A. C. power supply 72 supply energizing current for the primary winding of transformer 76 when the caliper releasing switch 72a is closed. Application of input current to the primary winding of the transformer 76 induces a response in its secondary winding to apply energizing current through conductor 31 and through the series load resistors 82 and 83 to the igniters 84 and 85. If both of the latter igniters are functioning properly they will be simultaneously detonated by the flow of current from the conductor 31, thereby to release the electrically releasable latching means 21 in the manner described above. In the event that either of these igniters is short circuited or is defective the load resistors 82 and 83 nevertheless insure that the other igniter will function properly to release the latching means to permit leaf springs 35 and 36 to direct the caliper arms 17 and 18 and the centralizer arms 19 and 20 outwardly and into engagement with the walls of the borehole 10 preparatory to the production of the caliper log.

With the four arms of the tool 10 in engagement with the walls of the borehole 11 the hoisting mechanism at the earth's surface functions to drive the sheave 13 and the takeup spool 14 in order to raise the caliper tool. The arms 17 and 18 are moved toward or away from each other in directions dependent upon the various diameters of the borehole encountered as the tool 10 is raised. Movement of these caliper arms induces relative differential rotation between the variable tap and the casing 41 of the rheostat 40 in order to provide across output terminals 42 and 43 resistance values varying as a function of the diameter of the borehole at each depth. Since the rheostat 40 is connected through cable conductors 64 and 65 to form one arm of a conventional Wheatstone bridge circuit embodied in the measuring device 66, it will be apparent that the signals appearing across output terminals 66a and 66b of this bridge circuit vary as a function of the resistance appearing between terminals 42 and 43. The output signals of the bridge circuit are applied through conductors 67a and 67b of the signal connector 67 to the recording apparatus 68 where these signals are recorded upon the recording medium driven in synchronism with the hoisting device for the caliper tool 10. Thus, the apparatus 68 produces a caliper log indicative of the borehole diameters at each depth traversed by the tool 10 during the survey.

Due to the fact that the caliper arms 17 and 18 induce differential rotation of the variable tap and slide wire of the rheostat 40, it will be observed that even small increments of movement of the caliper arms induce appreciable variations in the resistance values appearing at the output terminals 42 and 43 of the rheostat. Moreover, since a minimum number of movable parts is employed in the mechanism connecting each of the caliper arms to its associated movable element on the rheostat 40, it is apparent that inaccuracies due to friction are minimized. As a result of these features, the measurements of the well diameter provided at the surface not only possess a high degree of accuracy but also are responsive to even small diametric variations.

As previously indicated, the caliper tool of the present invention may, if desired, be employed in a one conductor cable system for measuring the diametric variations in a borehole. Such a system is illustrated in Fig. 11 wherein the electrically operable releasable latching means 21 and the potentiometer 40 are operated in the manner described above. However, in the system shown in Fig. 11 the potentiometer is connected in series with the primary windings of a plurality of transformers 102, the secondary windings of which supply current to the circuit for actuating the releasable latching means 21. Specifically, the potentiometer 40 and the primary windings of transformers 102 are connected to the surface equipment through the single conductor 101 of cable 100. The outer sheath 103 of the cable 100 provides a common ground connection between the surface equipment and the downhole apparatus. The sheath 103 and the conductor 101 are respectively connected at the surface to movable arms 105 and 106 of a manually operable double pole-double throw switch 104 which may be selectively actuated to induce a flow of current from power supply 72 to energize the releasable latching means 21 or to connect the potentiometer 40 to the measuring circuit 66.

Specifically, one pair of stationary contacts 109 and 110 is connected through a latch releasing switch 111 to the power supply 72. Obviously, with the switch 111 closed and with the movable arms 105 and 106 of switch 104 in respective engagement with contacts 109 and 110 power is delivered to the transformers 102 through conductor 101 and sheath 103 in order to release the latching means 21 in the manner described above. However, when the arms 105 and 106 are manually moved into engagement with fixed contacts 107 and 108 of the switch 104, the actuating circuit between power supply 72 and the transformers 102 is broken while, at the same time, the potentiometer 40 is connected in the bridge circuit of the measuring device 66. Thus, variations in resistance of the potentiometer induce corresponding changes appearing across output terminals 66a and 66b of the bridge circuit, which changes are continuously recorded by the apparatus 68 in the manner described above.

While a particular embodiment of the invention has been shown, it will be understood, of course, that the invention is not limited thereto since many modifications may be made and it is therefore contemplated by the appended claims to cover any such modifications as may fall within the true spirit and scope of the invention. Thus, it will be readily apparent that the bridge circuit 66 and the power supply therefor in the systems shown in Figs. 3 and 11 could be incorporated within the chamber 46 of the downhole tool instead of being located at the surface as illustrated. As a matter of fact, such a construction will eliminate the adverse effects resulting from changes in resistance of the conductors interconnecting the surface and subsurface equipment which might possibly be encountered in the arrangements illustrated in Figs. 1 and 11. Moreover, it will be recognized that instead of employing a potentiometer varied by the caliper arms, any component whose characteristic value changes by relative displacement of two of its elements could be used. Thus, a variable condenser, a differential transformer or other similar devices could be employed and all such devices are intended to be covered by the term "signal producing device" as used in the appended claims. Furthermore, instead of using a substantially linear potentiometer which varies in accordance with the angle between the caliper arm and the longitudinal axis of the tool as described above a potentiometer could be employed having a resistance change from one extremity to the other which varies as the sine of that angle. By employing such a potentiometer, the tool may be used in calipering boreholes of large diameter without requiring excessive movement between the potentiometer elements.

What is claimed as new and desired to be secured by Letters Patent of the United States is:

1. In a well surveying device for measuring diametric variations in a well, recording means at the earth's surface, downhole equipment including at least two spaced arm members, means for urging said arm members into engagement with the walls of the well, a signal producing means including at least two relatively movable elements cooperating to produce a single electrical signal representative of the diameter of the well in response to movement of said arm members, a cable connected between said recording means and said downhole equipment to supply said signal to said recording means in order to produce a log of well diameter as a function of well depth, and structure mechanically connecting each of said elements to one of said arm members in order to provide for differential relative movement between said elements in response to movement of said arm members along the walls of the well.

2. In a well surveying device for measuring diametric variations in a well, recording means at the earth's surface, downhole equipment including a body member having a chamber therein, at least two arm members pivotally carried by said body member at spaced positions thereon, means for urging said arm members into engagement with the walls of the well, a signal producing device within said chamber including at least two relatively movable elements cooperating to produce a single electrical signal representative of the diameter of the well in response to movement of said arm members, a cable connected between said recording means and said signal producing device for transmitting said electrical signal to the recording means in order to produce a log of well diameter as a function of well depth, and structure mechanically connecting each of said elements to a different one of said arm members in order to provide for differential relative movement between said elements in response to movement of said arm members along the walls of the well at different well depths.

3. In a well surveying device for measuring diametric variations in a well, a body member, at least two spaced arm members carried by said body member, means for urging said arm members into engagement with the walls of the well, a variable impedance device including a movable tap member and a movable impedance support, structure mechanically connecting said tap member to one of said arm members, structure mechanically connecting said support to the other arm member thereby to provide for relative differential movement between said tap member and said support in response to movement of said arm members along the wall of the well and means including said variable impedance device for producing a single signal representative of the diameter of the well in response to the differential movement of said tap member and said support.

4. In a well surveying device for measuring diametric variations in a well, a body member, at least two spaced arm members carried by said body member, means for urging said arm members into engagement with the walls of the well, signal producing means for producing a single signal representative of the diameter of the well and including a variable potentiometer having a movable tap and a rotatable support element, structure mechanically connecting said movable tap to one of said arm members and structure mechanically connecting said rotatable support to the other arm member thereby to provide for relative differential rotation between said tap and said support in response to movement of said arm members along the wall of the well.

5. In a well surveying device for measuring diametric variations in a well, the combination of a cable; indicating means at the surface of the earth for providing indications representative of the well diameter at different depths; and an assembly carried by said cable to be lowered into the well, said assembly comprising a body member, at least two spaced arm members carried by said body member, means for urging said arm members into engagement with the walls of the well, a variable device including at least two relatively movable elements electrically connected through said cable to said indicating means so that variations therebetween are continuously indicated at the earth's surface, and structure mechanically connecting each of said elements to one of said arm members in order to provide for differential relative movement between said elements in response to movement of said arm members along the walls of the well.

6. In a well surveying device for measuring diametric variations in a well, the combination of a cable; indicating means at the surface of the earth for providing indications representative of the well diameter at different well depths; a source of power; and an assembly carried by said cable to be lowered into the well, said assembly comprising a body member, at least two spaced arm members carried by said body member, means for urging said arm members into engagement with the walls of the well, a variable impedance device having a difference of potential impressed thereacross from said source of power, a variable tap member on said variable impedance electrically connected through said cable to said indicating means, structure mechanically connecting the variable tap member to one of said arm members, a rotatable impedance support, and structure mechanically connecting said rotatable impedance support to the other of said arm members in order to effect differential movement between said variable tap and said support in response to movement of said arm members along the wall of the well.

7. In a well surveying device for measuring diametric variations in a well, the combination of a cable; indicating means at the surface of the earth for providing indications representative of the well diameter at different depths; an assembly carried by said cable to be lowered into the well, said assembly comprising a body member, at least two spaced arm members carried by said body member, resilient means for urging said arm members into engagement with the walls of the well, a variable device including at least two relatively movable elements electrically connected through said cable to said indicating means whereby the variations therebetween are continuously indicated at the earth's surface, structure mechanically connecting each of said elements to one of said arm members in order to provide for differential relative movement between said elements in response to movement of said arm members along the walls of the well, and electrically releasable means for retaining said arm members in inoperative position on said body member; and means at the earth's surface for sending an electric current through said cable to release said electrically releasable means in order to permit said resilient means to force said arm members into engagement with the walls of the well.

8. In a well surveying device for measuring diametric variations in a well, the combination of a cable; a source of power; indicating means at the surface of the earth for providing indications representative of the well diameter at different depths; an assembly carried by said cable to be lowered into the well, said assembly comprising a body member, at least two spaced arm members carried by said body member, and electrically releasable means for retaining said arm members in inoperative position on said body member while said assembly is moved to a predetermined position in said well; and means at the earth's surface for sending an electric current through said cable to operate said electrically releasable means in order to release said arm members; said assembly also including means for urging said arm members into engagement with the walls of the well after operation of said electrically releasable means, a variable impedance device having a difference of potential impressed thereacross from said source of power, a variable tap member on said variable impedance electrically connected through said cable to said indicating means, structure mechanically connecting said variable tap member to a first of said arm members, a rotatable impedance support, and structure mechanically connecting said support to the second of said arm members in order to effect relative differential rotation between said variable tap and said support in response to movement of said arm members along the walls of the well.

9. In a well surveying device for measuring diametric variations in a well, the combination of a cable, indicating means at the surface of the earth for providing indications representative of the well diameter at different well depths; an assembly carried by said cable to be lowered into the well, said assembly comprising a body member, at least two spaced arm members carried by said body member, electrically releasable means for retaining said arm members in inoperative position on said body member, and means for urging said arm members into engagement with the walls of the well after operation of said electrically releasable means; means at the earth's surface for sending an electric current through said cable to operate said electrically releasable means in order to release said arm members, a rheostat electrically connected through said cable to said indicating means whereby variations in resistance of said rheostat may be continuously indicated at the earth's surface, said rheostat including a variable tap member and a rotatable winding support, means mechanically connecting said variable tap member to one of said arm members, and means mechanically connecting said rotatable support to the other of said arm members in order to effect differential relative rotation between said variable tap and said support in response to movement of said arm members along the walls of the well.

10. In a well surveying device for measuring diametric variations in a well, a body member, at least two spaced caliper arms carried by said body member, means for urging said caliper arms into engagement with the walls of the well, a first gear element carried by a first of said arms, a second gear element carried by the second of said arms, a variable impedance device including a support and a tap member, means rotatably mounting said support and including an element in engagement with said first gear element in order to impart the movement of said first arm member to said support, a shaft carrying said tap member, a gear member mounted upon said shaft in engagement with said second gear element, thereby to impart the movement of said second arm member to said variable tap in order to effect differential relative rotation between said tap and said support in response to movement of the arm members along the wall of the well.

11. In a well surveying device for measuring diametric variations in a well the combination of a body member, at least two spaced caliper arms carried by said body member, at least two additional arm members carried by said body member at positions spaced from said caliper arms, resilient means for urging said arm members laterally of the well and into engagement with the walls thereof in order to maintain the body member at substantially the center of the well, additional resilient means for urging said caliper arms into engagement with the walls of the well, said additional resilient means being somewhat weaker than said first mentioned resilient means in order to enable the caliper arms accurately to follow the contour of the walls of the well means jointly responsive to the movement of said caliper arms for producing a single signal representative of the diameter of the well, and means for recording the signal produced by the last-named means at the various well depths penetrated by said body member in order to produce a log of the diameter of the well.

12. In a well surveying device for measuring diametric variations in a well, the combination of a cable, an assembly carried by said cable to be lowered into the well, said assembly comprising a body member and at least two spaced apart movable arm members carried by said body member and adapted to engage the walls of the well, means jointly responsive to the movement of said arm members for producing a single electrical signal representative of the diameter of the well, and means at the earth's surface connected to said assembly through said cable for recording said signal at different well depths traversed by said assembly in order to provide a single curve of the well diameter as a function of depth.

References Cited in the file of this patent

UNITED STATES PATENTS

| | | |
|---|---|---|
| 1,339,955 | Hardel | May 11, 1920 |
| 2,102,080 | Kinley | Dec. 14, 1937 |
| 2,340,987 | Robidoux | Feb. 8, 1944 |
| 2,415,636 | Johnson | Feb. 11, 1947 |
| 2,419,461 | Neff | Apr. 22, 1947 |
| 2,640,275 | Boucher | June 2, 1953 |
| 2,660,800 | Wiley | Dec. 1, 1953 |

FOREIGN PATENTS

| | | |
|---|---|---|
| 463,361 | Great Britain | Mar. 30, 1937 |